US008285713B2

(12) United States Patent
Luo et al.

(10) Patent No.: US 8,285,713 B2
(45) Date of Patent: Oct. 9, 2012

(54) IMAGE SEARCH USING FACE DETECTION

(75) Inventors: Jing Luo, Beijing (CN); Xiao Xun Zhang, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/206,147

(22) Filed: Sep. 8, 2008

(65) Prior Publication Data

US 2009/0234842 A1   Sep. 17, 2009

(30) Foreign Application Priority Data

Sep. 30, 2007   (CN) .......................... 2007 1 0163091

(51) Int. Cl.
*G06F 17/30* (2006.01)
(52) U.S. Cl. ................ 707/723; 707/758; 707/E17.014; 707/E17.03
(58) Field of Classification Search ........... 707/999.005, 707/E17.014, E17.03, 722, 758, 723
See application file for complete search history.

(56) References Cited

U.S. PATENT DOCUMENTS

| 6,108,700 | A | 8/2000 | Maccabee et al. |
| 6,381,628 | B1 | 4/2002 | Hunt |
| 6,661,907 | B2 | 12/2003 | Ho et al. |
| 6,792,460 | B2 | 9/2004 | Oulu et al. |
| 6,983,463 | B1 | 1/2006 | Hunt |
| 7,127,452 | B1 | 10/2006 | Yashiro |
| 7,194,468 | B1 * | 3/2007 | Bacila et al. ........................ 1/1 |
| 7,203,338 | B2 | 4/2007 | Ramaswamy et al. |
| 2003/0009507 | A1 | 1/2003 | Shum |
| 2003/0229695 | A1 | 12/2003 | McBride |
| 2004/0131235 | A1 | 7/2004 | Chen et al. |
| 2004/0243407 | A1 | 12/2004 | Yu et al. |
| 2005/0192955 | A1 * | 9/2005 | Farrell ............................. 707/5 |
| 2006/0155684 | A1 | 7/2006 | Liu et al. |

(Continued)

FOREIGN PATENT DOCUMENTS

CN   1508752 A   6/2004

(Continued)

OTHER PUBLICATIONS

Chen, Li Na, World of Networks: Image Search Engine on the Internet, Jan. 2001, English Translation Only.

(Continued)

*Primary Examiner* — Fred I Ehichioya
*Assistant Examiner* — Shiow-Jy Fan
(74) *Attorney, Agent, or Firm* — Jon A. Gibbons; Fleit Gibbons Gutman Bongini & Bianco PL

(57) ABSTRACT

An image search method and system using face detection, begins with receiving a query submitted by a user. Next a query word is searched in the query from an image resource using an image search engine to obtain an initial image collection. Any faces are detected in each image in the initial image collection which has been searched. A search for the query word in a text surrounding each image having the face in the initial image collection is performed. A determination is made whether the query word indicates at least one person's name in the surrounding text matching the query word. An image an image in the initial image collection is returned to a user in which the face is included and the query word in the surrounding text indicates the person's name.

12 Claims, 13 Drawing Sheets

U.S. PATENT DOCUMENTS

| | | | |
|---|---|---|---|
| 2006/0235664 A1 | 10/2006 | Vinberg et al. | |
| 2006/0239515 A1* | 10/2006 | Zhang et al. | 382/118 |
| 2006/0253491 A1 | 11/2006 | Gokturk et al. | |
| 2006/0274978 A1* | 12/2006 | Fukuda et al. | 382/305 |
| 2008/0097981 A1* | 4/2008 | Williams et al. | 707/5 |
| 2008/0130960 A1* | 6/2008 | Yagnik | 382/118 |

FOREIGN PATENT DOCUMENTS

| | | |
|---|---|---|
| CN | 1573923 A | 2/2005 |
| EP | 1229685 A2 | 8/2002 |
| WO | WO0110082 A2 | 2/2001 |

OTHER PUBLICATIONS

Margulius, David L., "Reeling in the Tiers," Info World, May 16, 2002.

"Load Testing Monitors," Mercury LoadRunner Monitor for Microsoft COM+; http://www.mercury.com/us/products/performance-center/loadrunner/monitors/COM.html.

Pinto-Elias, R., et al., "Automatic Facial Feature Detection and Location," Proceeding of the 14th International Conference on Pattern Recognition, vol. 2, 1998, pp. 1360-1364.

Ben-Haim, N., et al., "Improving Web-Based Image Search Via Content Based Clustering," In IEEE Xplore SLAM, New York City, NY, 2006.

Wang, T., et al., "Portrait Retrieval Based on News Environment," Journal of Shandong University, vol. 41, No. 3, Jun. 2006.

Office Action dated Mar. 16, 2011 for Chinese Patent Application No. 200710163091.0.

* cited by examiner

QUERY: P1

6-1

P1, P5, P6 IN 2005

6-2

THE PRIZED PHOTOGRAPH OF WINNER P1

6-3

P1 IN 2004

6-4

THE RED LEAF COLLECTED BY P1

6-5

THE PET DOG ADOPTED BY P1

6-6

INVITATION OF P1

QUERY: P2 P3

7-1

P2, P3, P5 IN 2003

7-2

THE FISH COOPERATIVELY RESEARCHED BY P2, P3

7-3

INTIMATE (P2, P3)

7-4

P2 IN CAMPUS 7-5

BIRD ADOPTED BY P2

7-6

P3 FIRST COMING TO BEIJING

RETURN RESULT: P1
8-1

P1 IN 2004

8-2

P1, P5, P6 IN 2005

8-3

INVITATION OF P1

8-4

THE PRIZED PHOTOGRAPH
OF WINNER P1

8-5

THE RED LEAF
COLLECTED BY P1

8-6

THE PET DOG ADOPTED
BY P1

RETURN RESULT: P2 P3

9-1

INTIMATE(P2, P3)

9-2

P2, P3, P5 IN 2003

9-3

P2 IN CAMPUS 9-4

P3 FIRST COMING TO BEIJING 9-5

THE FISH COOPERATIVELY
RESEARCHED BY P2, P3, 9-6

BIRD ADOPTED BY P2

QUERY: P4 P5 P6

10-1

GROUP PHOTO OF P4, P5, P6

10-2

GROUP PHOTO (P2 P4 P6 P5)

10-3

P6 P5

10-4

MOUNTAIN L CLIMBED BY P4, P6, P5

10-5

RIVER IN FLOWING BY HOUSES OF P4, P6, P5

10-6

P4 P6

10-7

P4, P6, P5 UNDER BURNING SUN 10-8

P6

10-9

PHASE RESEARCH (P6, P5)

10-10

RESEARCH GROUP TREATS P4, P6, P5 AS BACKBONES 10-11

P4 P5

10-12

P2 IN A SPORT SUIT OF BRAND P6

10-13

HEADER P5

10-14

P4 P6 P5

10-15

P4, P6, P5 FROM LEFT OF THE FRONT ROW

RETURN RESULT: P4 P5 P6

11-1

GROUP PHOTO OF P4, P5, P6

11-2

P4, P6, P5

11-3

GROUP PHOTO (P2 P4 P6 P5)

11-4

RESEARCH GROUP TREATS
P4, P6, P5 AS BACKBONES 11-5

P4, P6, P5 FROM LEFT OF
THE FRONT ROW 11-6

P6, P5

11-7

P4, P6

11-8

P6

11-9

P4, P5

11-10

HEADER P5

RETURN RESULT: P4 P5 P6

12-1

MOUNTAIN L CLIMBED BY
P4, P6, P5

12-2

RIVER H FLOWING BY
HOUSES OF P4, P6, P5

12-3

P4, P6, P5 UNDER BURNING SUN 12-4

PHASE RESEARCH (P6, P5)

IMAGE SEARCH USING FACE DETECTION

CROSS-REFERENCE TO RELATED APPLICATIONS

This application is based upon and claims priority from prior Chinese Patent Application No. 200710163091.0, filed on Sep. 30, 2007 the entire disclosure of which s herein incorporated by reference.

FIELD OF THE INVENTION

The present invention generally relates to methods and systems for an image search, and more particularly to an image search method and system for image search using face detection technology.

BACKGROUND OF THE INVENTION

Recently, developments in computer and network technologies provide rich resource for retrieving information. Also, the amount of information which can be retrieved from network is quickly increasing at an explosive rate. An effective search means is needed to retrieve the exact information desired. Typically search engines facilitate retrieving information for a user. However, with the continual increase in the amount of the information on network, the corresponding amount of searched results returned which does not meet requirement is increasing, i.e. the irrelevant information returned from a search.

In total class of information search, the people search occupies significant portion. Currently, the people search is normally realized by inputting people names into the image search engines, with the desire that only images in relevant to the people being search will be retrieved. However, current image search engines usually return lots of irrelevant web images by manner of inputting people names to perform search, even images without image of the person at all, reducing users' satisfaction.

Current image search engines search for web images using text-based features, such as image file name, anchor text linking to associated page, or surrounding text. In the case of people search, if a people name is present in the surrounding text, the corresponding images will be returned to the user. However, due to inconsistence between image contents and text descriptions, the user might be presented with images with various contents when searching based on features of text only.

Named Entity Recognition (NER) technology has great development recently which is an important component of an Information Extraction (IE) system, and its main task is to recognize specific names including people names, place names, institution names and time expressions and digital expressions in a text. Current Named Entity Recognition method is mainly divided into rule-based method and statistics-based method.

Generally, the rule-based method is to create some rules for entity recognition by some experienced experts with respect to specific languages, areas, text formats and the like. For example, a people name may be a subject or an object of a certain sentence, dates present in the art may basically follow some format, and so on. Accordingly, entity matching is performed in the text and type of each entity is determined based on these rules.

Another technical idea is the statistics-based method. At first, entities present in a text are manually marked; then, according to the context of each entity, some features are automatically extracted, wherein such features are such as people names are normally followed by verbs, adjectives are normally followed by specified nouns, and so on. At last, the type of each entity is decided by a classification algorithm. Marking language materials does not need wide acknowledge on computing language and can be finished within a short period. Such system may be not or seldom modified when being transplanted to a new area as long as it is trained by new language materials once. In addition, transplanting the statistic-based system to texts in other natural languages is relatively easier.

In research of information extraction, Named Entity Recognition is the most valuable technology currently. According to an evaluation result, the F-exponential (the weighted geometrical average of recall and precision, wherein the weight is set to 1) of Named Entity Recognition task can be up to more than 90%. Existing systems can realize English Named Entity Recognition with high precision, such as "GATE" system (an open-source software), which realizes rule-base and statistics-based methods, respectively, and can achieve a higher precision by combining the two methods. In addition, some commercial systems are focused on Chinese Named Entity Recognition, such as mass Chinese processing system developed by Mass Technology development limited company.

Also, face detection technology has great development recently, and this technology is a typical pattern recognition problem with respect to specific content and is concerned by academics and industry. The task of face detection is to judge whether there is a face in an input image, and if there is a face, position and size of the face are labeled. In general, current technologies can be divided into organ-based method and template-based method.

The organ-based method treats a face as a combination of typical features and/or organs, firstly extracts some important features such as eyes, noses, lips and so on, and then detects the face according to positions of the features and geometrical relationships there between. The template-based method treats the face as a whole pattern, i.e. a two-dimensional pixel matrix. From viewpoint of statistics, a face pattern space is established by a lot of samples of face images, and it is judged whether there is a face based on degree of likeness. Under the two frames, many methods are developed. In addition, face detection using color information is also an effective method.

After determining a face model, a face detection system further needs functions of feature extraction and classification decision. The two functions are both performed relating to the face model. In general, the feature extraction can be implemented in the space domain or frequency domain of the image. The classification decision is an important content which the statistic pattern recognition researches. During the researching, people realize that combining various technologies and using various information can improve the efficiency of face detection methods. This trend will continue into the future.

In related research of the pattern recognition, the face detection is developed maturely and has achieved a certain technical level either in detection speed or in detection precision. There are some systems or products for commercial applications, including Identix®, Viisage® and Cognitec®, all of which can realize the function of detecting the face exactly and quickly in complex environment and background. In addition, the researchers in Institute of Computing Technology and Institute of Automation of Chinese Academy of Science have also developed face detection systems with high precision.

U.S. patent application publication No. US2006/0155684A1 proposes an improved solution for the existing image search methods, which firs performs searching using the existing image search engines according to a query submitted by a user and returns the results, then analyzes the important regions in the images, generates an object concerned by user and extracts the concerned object. Then the images are presented to the user using Multi-Dimension Scaling (MDS) technology according to the likeness between images. The solution analyzes only the important regions in the images. Thus on one hand, determination of the important regions may render the system overburdened, and on the other hand, the actually important information in the images may be omitted. Also, since the solution uses only the existing image search engines to perform image searching, without text analyzing technology to perform people name searching in the texts surrounding the images, the search method although simple, presents a problem with accuracy of relevant search terms.

U.S. patent application publication No. US2006/0253491A1 proposes another improved solution for the existing image search method, which focuses on searching in an image library, and establishes indexes of the image library using recognizable information in the images. The solution firstly analyzes the recognition information such as faces, clothes, decorations and so on of the people in the images, analyzes the texts occurred in the images, associates these information with the images, establishes indexes based on these information, and distinguishes people with different identities according to the recognition information. The patent performs search with respect to the image library but not directly with respect to larger range of images in networks. So if the solution is applied to the large-scale search for the images in networks, the following problem will occur wherein since the patent establishes the image indexes by directly analyzing all the image contents and using Optical Character Recognition (OCR) technology to analyze the texts in the image, without establishing more efficient indexes with respect to particular types of queries to intentionally search a part of images, the load of search processing is extremely large, and since the solution requires complex recognition technologies such as face recognition, the processing is complicated, and the stability and reliability is not adequate.

According what is needed is a method and system to overcome the problems encountered in the prior art and to provide an image search method and a system capable of implementing a face search with simplified scale and high efficiency.

SUMMARY OF THE INVENTION

The foregoing and other features and advantages of the present invention will be apparent from the following more particular description of the preferred embodiments of the invention, as illustrated in the accompanying drawings.

The invention is proposed with respect to the above defects existing in the art and the technical problem to be solved by the invention is to propose an image search method using face detection and an image search system using face detection for implementing an image search with simplified scale and high efficiency.

According to an aspect of the invention, an image search method using face detection is proposed, the method comprising: a receiving step of receiving a query submitted by a user; a first searching step of searching for a query word in said query from an image resource using an image search engine to obtain an initial image collection; a detecting step of detecting a face in each image in the searched initial image collection; a second searching step of searching for said query word in a text surrounding each image having the face in said initial image collection, and judging whether said query word indicates a people name in the surrounding text; and a returning step of returning an image in the initial image collection to the user in which a face is included and said query word in said surrounding text indicates a people name.

According to another aspect of the invention, an image search system using face detection is proposed, the system comprising: a receiving means for receiving a query submitted by a user; a first searching means for searching for a query word in said query from an image resource using an image search engine to obtain an initial image collection; a detecting means for detecting a face in each image in the searched initial image collection; a second searching means for searching for said query word in a text surrounding each image having the face in said initial image collection, and judging whether said query word indicates a people name in the surrounding text; and a returning means for returning an image in the initial image collection to the user in which a face is included and said query word in said surrounding text indicates a people name.

According to the invention, the false alarm rate in the image search result can be remarkably decreased, the precision in the image search can be improved, and the satisfying rate of users can be increased by establishing search indexes with simplified scale and high efficiency to stably and reliably perform the image search using face detection technology.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

The embodiments selected by the present invention and many objects, features and advantages obtained hereby can be understood through the detailed description with reference to the accompanying drawings in which.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

As compared with normal information search, the face search has the following features: firstly, the face search belongs to an image search and the desired result should include a face; secondly, typically there are explanation texts surrounding the images, and the surrounding texts typically include a people name. The image search method and the image search method of the invention are designed with respect to the above features.

Now, the embodiments of the invention will be explained in details.

Figure 1:
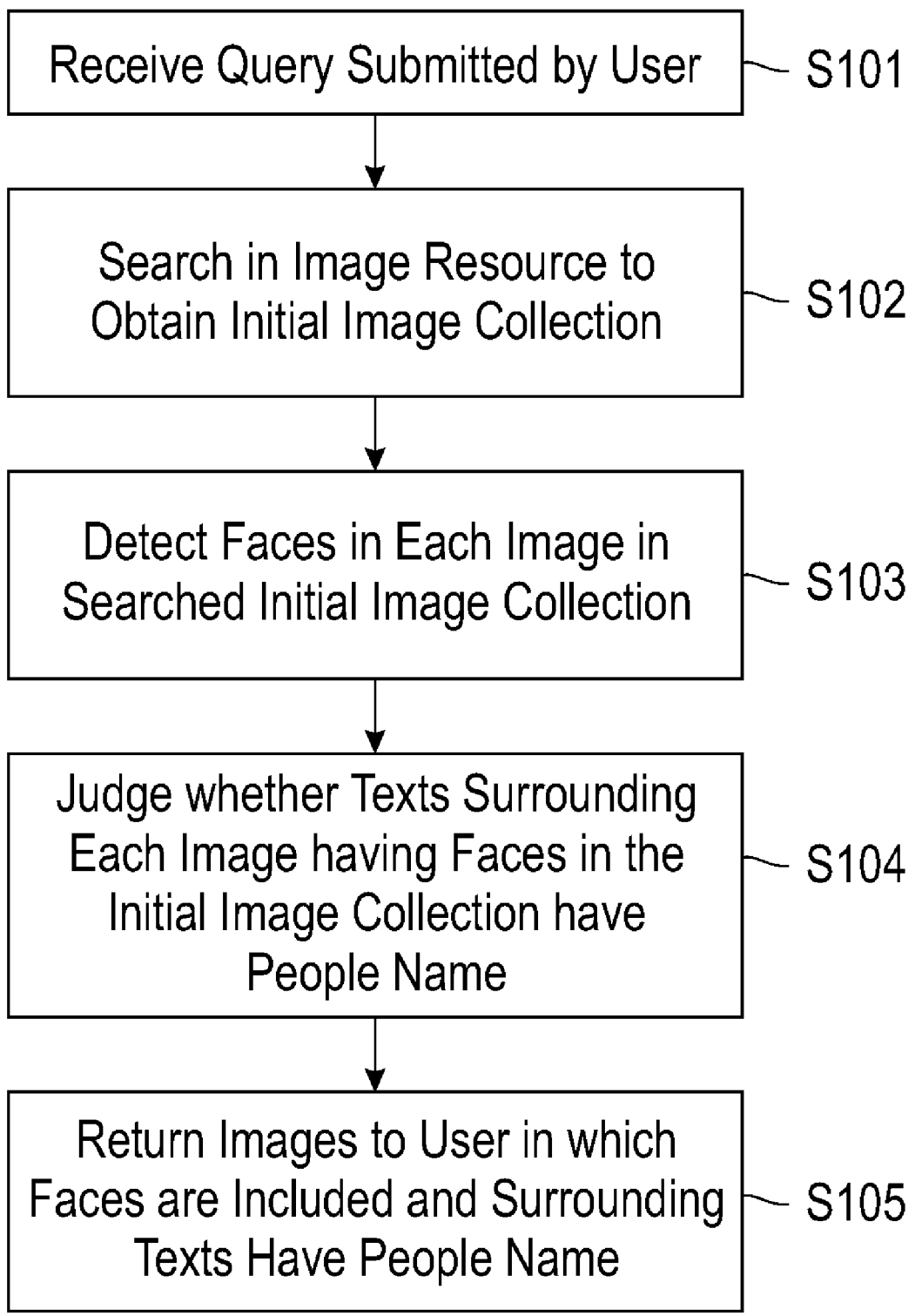
FIG. 1 is a general flowchart showing an image search method using face detection according to the invention.

FIG. 1 is a general flowchart showing an image search method using face detection according to the invention.

At first, at step S101, a query is input by a user, and the query input by the user is received. The invention is for face search, so an existing image search engine can be used. At step S102, the image search engine performs searching in an image resource to obtain an initial image collection, wherein said image resource may be intranet, local area network, wide area network or Internet, and may be database or even storage devices in personal computers or servers, such as hard disc, floppy disk, optical disc and so on.

Figure 6:
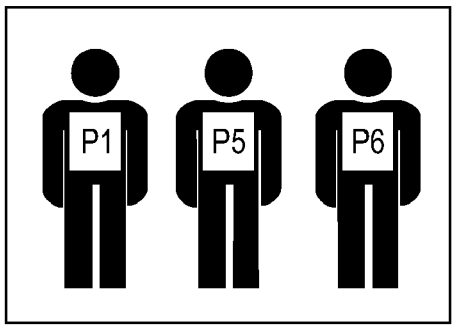
FIG. 6 is a diagram explaining an example of an initial image collection returned when querying one person.
Figure 6:
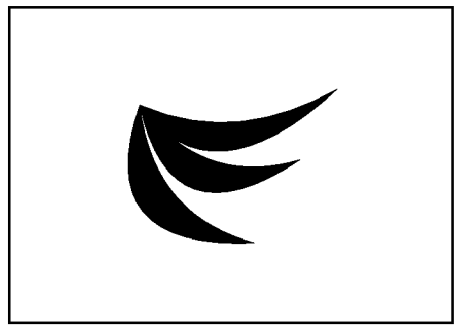
Figure 6:
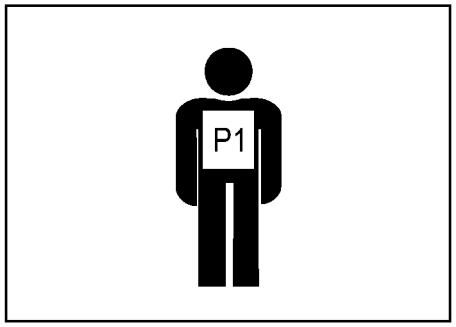
Figure 6:
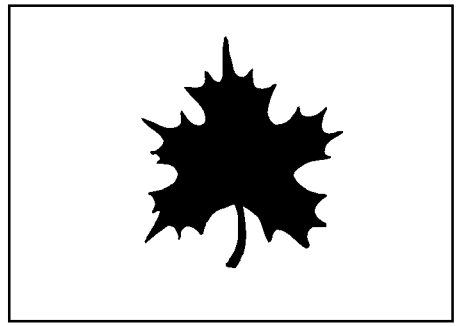
Figure 6:
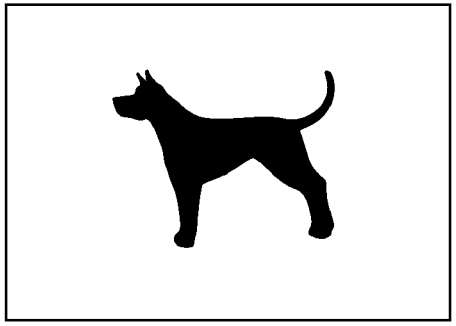
Figure 6:
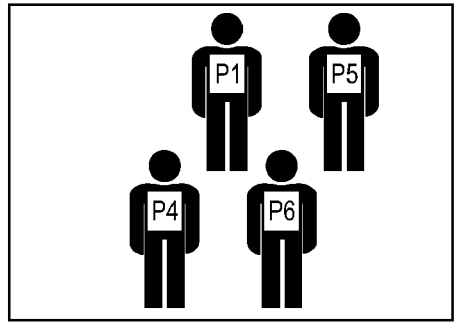
Figure 7:
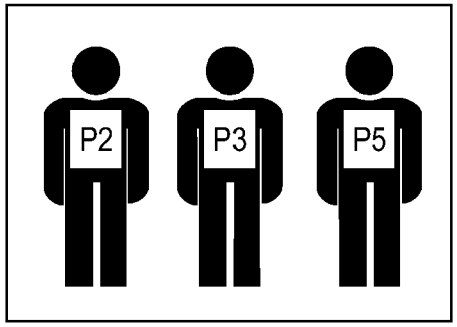
FIG. 7 is a diagram explaining an example of an initial image collection returned when querying two persons.
Figure 7:
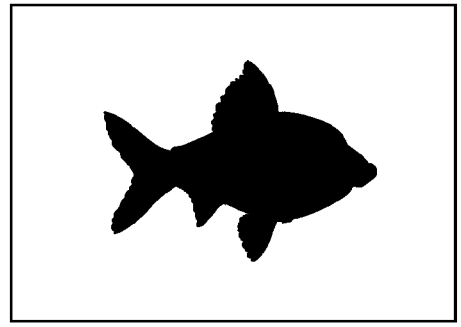
Figure 7:
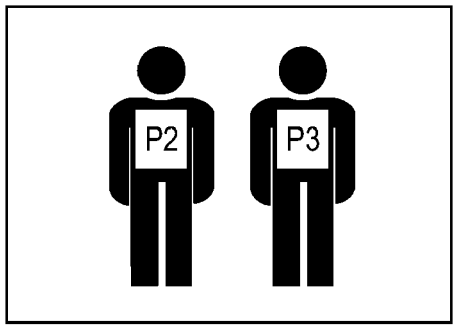
Figure 7:
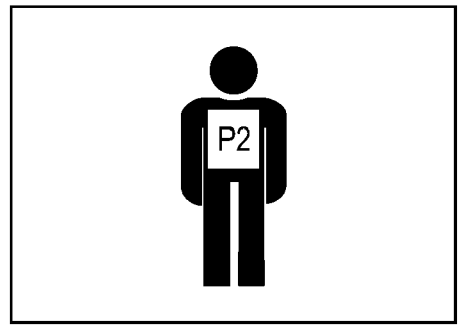
Figure 7:
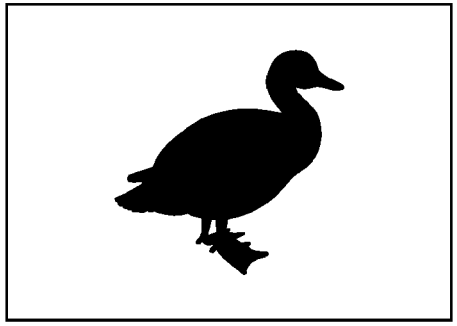
Figure 7:
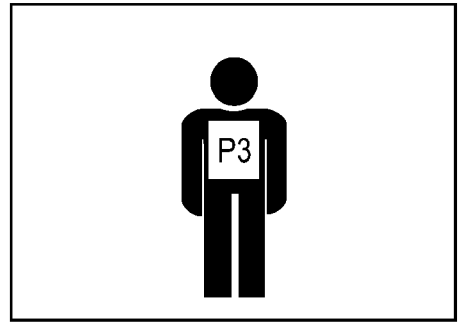
Figure 8:
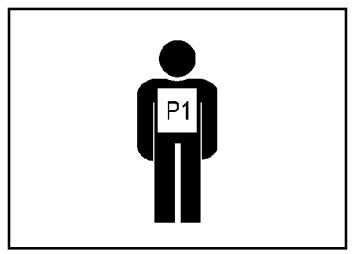
FIG. 8 is a diagram explaining an example of reordered images returned when querying one person.
Figure 8:
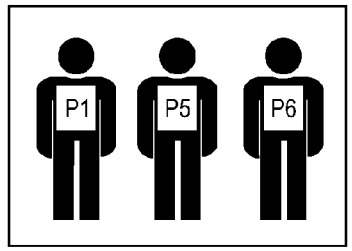
Figure 8:
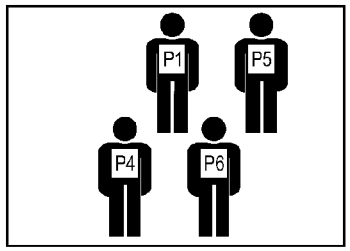
Figure 8:
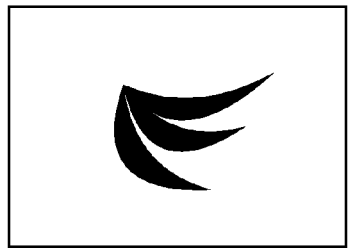
Figure 8:
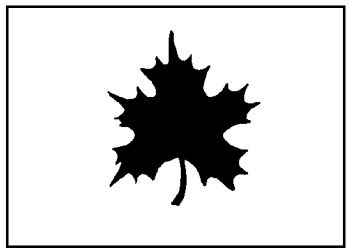
Figure 8:
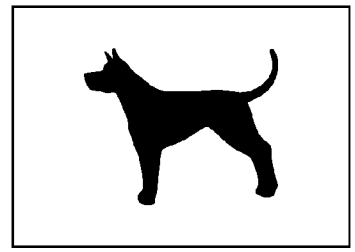
Figure 9:
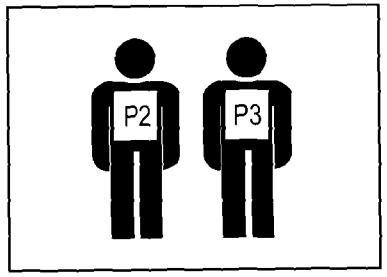
FIG. 9 is a diagram explaining an example of reordered images returned when querying two persons.
Figure 9:
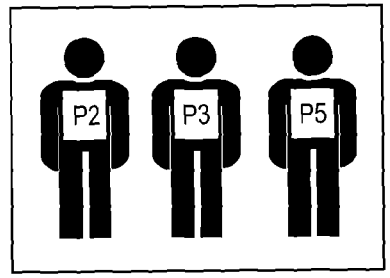
Figure 9:
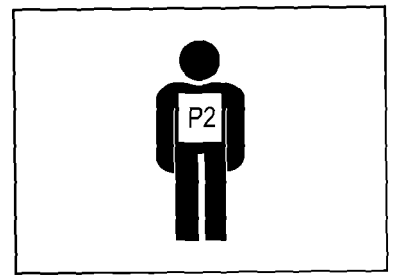
Figure 9:
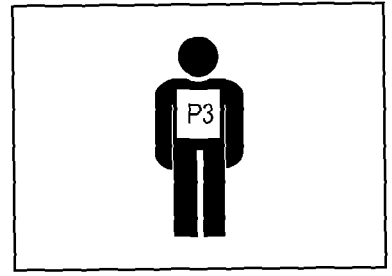
Figure 9:
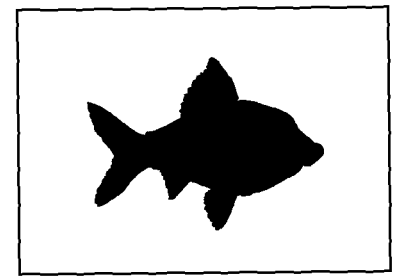
Figure 9:
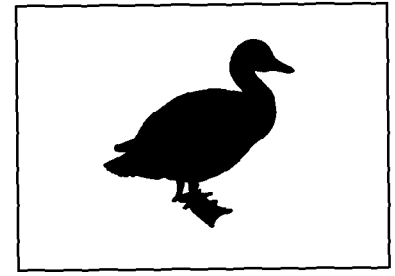
Figure 10:
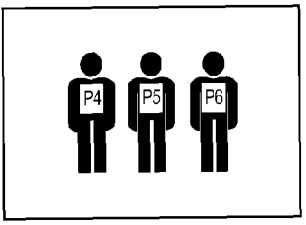
FIG. 10 is a diagram explaining an example of an initial image collection returned when querying three persons.
Figure 10:
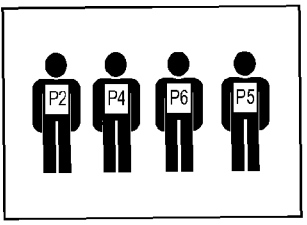
Figure 10:
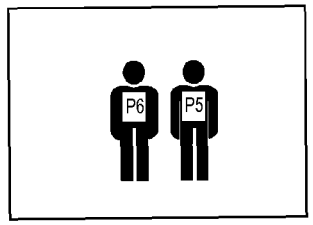
Figure 10:
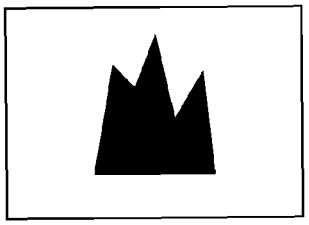
Figure 10:
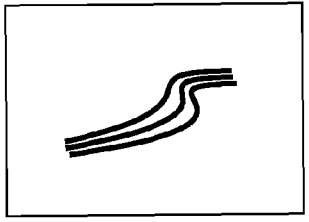
Figure 10:
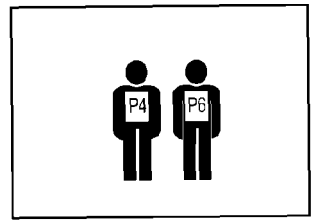
Figure 10:
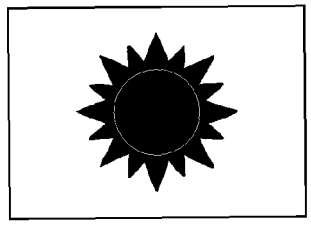
Figure 10:
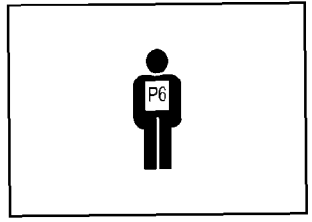
Figure 10:
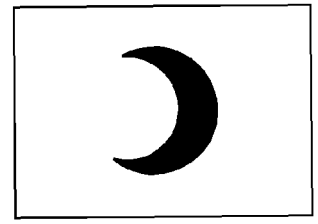
Figure 10:
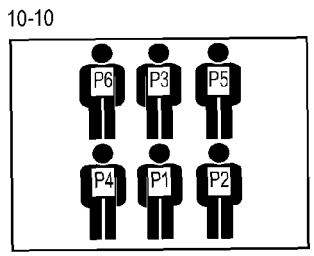
Figure 10:
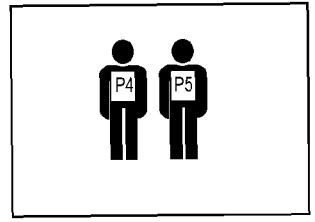
Figure 10:
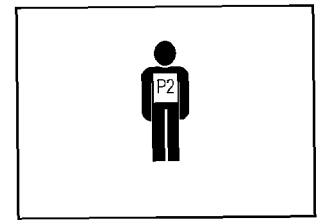
Figure 10:
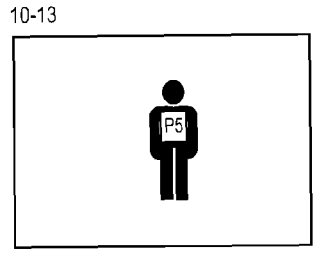
Figure 10:
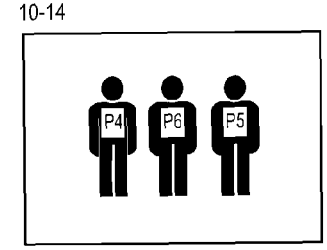
Figure 10:
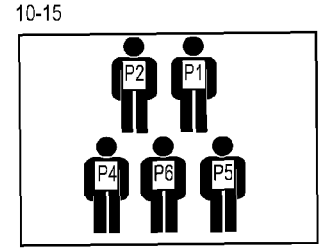

Considering copyright, people right and politics, religion and so on, in the present specification, the image search method and the image search method using face detection of the invention are explained by means of schematic images, as shown in FIG. 6 to FIG. 12. In each of the schematic image, each reduction image separated from each other indicates a searched or reordered image, in which person shapes indicate the persons in the images. Assumed each person shows his face in the images, the characters such as P1, P2, P3 ... in each person shape indicate a name of the person for identifying the person. Also, in above-mentioned schematic diagrams FIG. 6 to FIG. 12, identical characters for identifying persons indicate the same person. In search examples as shown in FIG. 6 to FIG. 12, it is assumed that the obtained initial image collections are shown in FIG. 6, FIG. 7 and FIG. 10, respectively, and those skilled in the art should be capable of understanding the principle of the invention embodied by the drawings according to the descriptions, without limited to the specific examples in the drawings.

If a user intends to search photos of a person named "P1" from the Internet, and enters a query that is composed of a query word "P1" in the image search engine, the initial image collection may be as shown in FIG. 6. Since in searches in the current image search engine, corresponding images will be returned to the user as long as the query word occurs in the texts surrounding the images, not only the photos of P1 such as the personal photo of P1 as shown in the image 6-3 and the group photos of P1 and others as shown in the images 6-1 and 6-6 but also the photos in which there is no P1 or even no person as shown in the images 6-2, 6-4, 6-5 are returned.

In FIG. 6 and the following FIG. 7 to FIG. 12, the labels above each image, such as 6-5, 7-4, 10-9 and so on are added for clear explanations of the images, but not meaning that there should be such labels above each image processed in the present embodiment of the invention; the words below each image such as "P1 in 2004" below the image 6-3 of the FIG. 6 schematically show the texts surrounding the images, but not meaning that the texts surrounding each image processed in the present embodiment of the invention have to be these words. Bold and underlined words in the shown texts surrounding the images such as the "P5" in "header P5" surrounding the image 10-13 of FIG. 10 indicates that the bold word "P5" matches the query word "P5", but not meaning that the words in the texts surrounding each image processed in the present embodiment of the invention matching the query word have to be bold.

If a user intends to search a group photo of a person named "P2" and a person named "P3" from Internet and enters a query that is composed of a query word "P2" and a query word "P3" in the image search engine, the initial image collection may be as shown in FIG. 7, wherein not only the group photos of P2 and P3 such as the photo as shown in the image 7-3 and the group photo of P2, P3 and others as shown in the image 7-41, but also the personal photo of P2 as shown in the image 7-4, the personal photo of P3 as shown in the image 7-6 and the photos in which there is no person as shown in the images 7-2 and 7-5 are returned.

In searches for faces, although the user enters the person name as the query word intending to search the images of the person, there are normally the images related to the person but not containing the person therein in the image resource, and the descriptions for the person inevitably occur in the texts surrounding the images, such as "the prized photograph of winner P1" occurring in the surrounding texts in the image 6-2 of FIG. 6, "the fish cooperatively researched by P2, P3" occurring in the surrounding texts in the image 7-2 of FIG. 7 and "mountain L climbed by P4, P6, P5" occurring in the surrounding texts in the image 10-4 of FIG. 10 due to the images being related to the person, so that such images are returned to the user by the traditional image search engines.

So far, the method of the invention for searching faces may use the same method as that in the image search engine in the related art. The existing image search engines normally return the initial image collection to the user as a final result. However, in the method of the invention for searching faces, the initial image collection may be either returned to the user, or not returned to the user since the method of the invention for searching people will perform further operations on the initial image collection, but making the operations so far are transparent to the user.

However, in the step S103, with respect to each image in the initial image collection, it is detected whether the image contains a face. For this, it is determined by face detection technology or by complex face recognition technology whether the image contains the face. A face recognition technology is described in the U.S. patent application publication US 2006/0253491 A1, the teachings of which is hereby incorporated by reference in its entirety. Then, in the step S104, for an image in the initial image collection in which a face is detected, the received query word input by the user is searched in the texts surrounding the image, and it is judged whether the searched query word in the surrounding texts indicates a people name, wherein the process for judging whether the searched query word in the surrounding texts indicates the people names can be realized by the Named Entity Recognition technology or other technologies capable of detecting or determining the people name in the texts. By the above judgment, the query word indicating other meanings such as place names or brand names can be distinguished from the same query word actually indicating people names. For example, if "P1" is not only a person name but also a corporation name and a brand name, the images in which "P1" in the texts surrounding the images actually indicates a person name can be obtained.

At last, in the step S105, in a case that the images in which faces are included and the query words in the texts surrounding the images actually indicate people names in the initial image collection are returned to the user. When the query word is "P1", the result is as shown in FIG. 8, and in such case, the images 8-1, 8-2 and 8-3 are returned to the user. When the query word is "P2 P3", the result is as shown in FIG. 9, and in such case, the images 9-1, 9-2, 9-3 and 9-4 are returned to the user. Therefore, the search with simplified scale can be realized, the false alarm rate is decreased and the search efficiency is improved.

Figure 2:
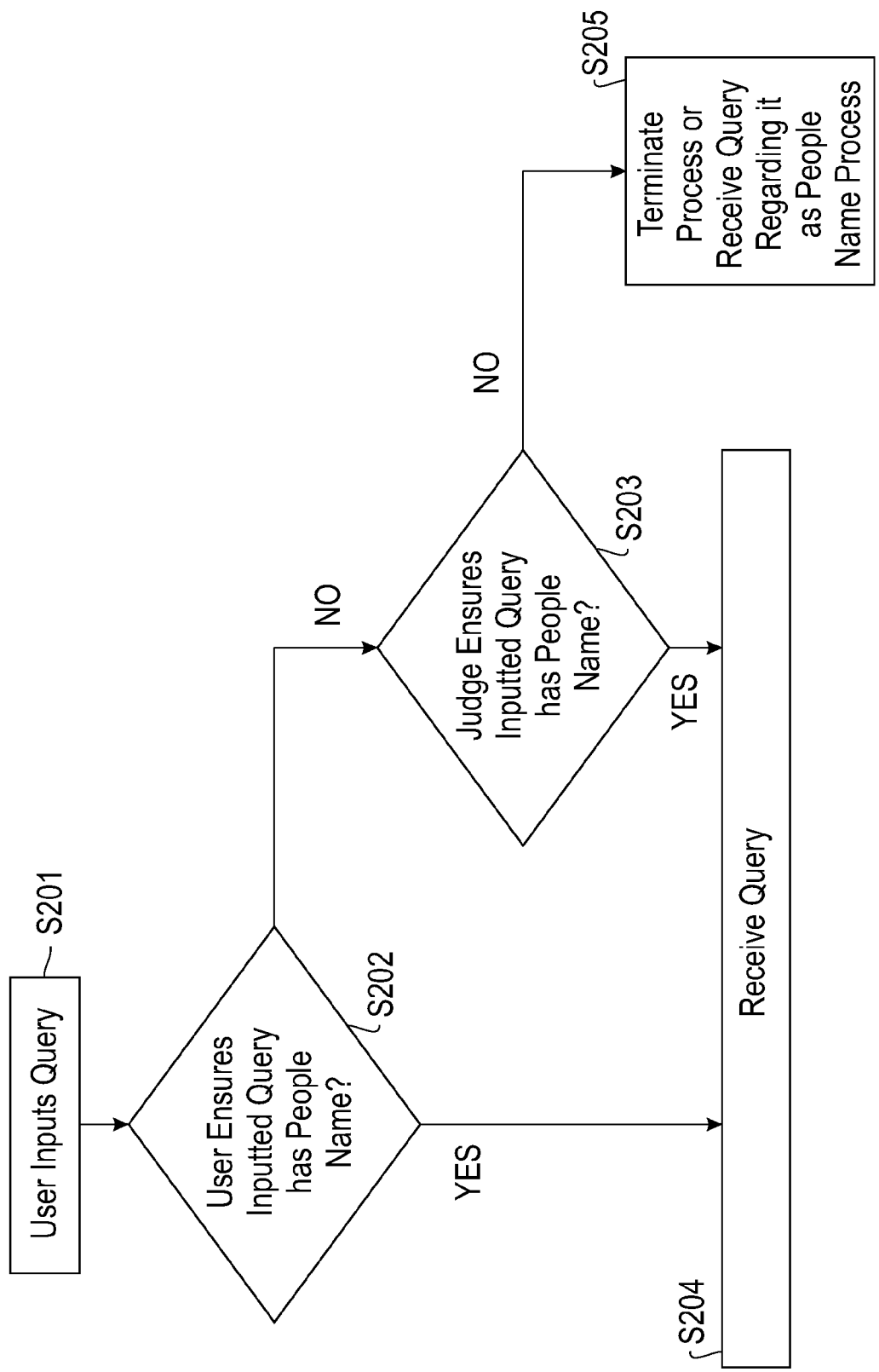
FIG. 2 is a flowchart showing another method of receiving a query input by a user.

FIG. 2 shows an improved solution of step S101 for receiving the query input by the user in FIG. 1.

The invention focuses on face search, so it may be assumed that since the user performs a face search, after the user inputs the query in step S201, it is considered that the user can ensure the query word in the input query necessarily contains people names as shown in step S202, and the query is received in step S204. However, the invention can perform judgment for the query input by the user, as shown in step S203, and perform processing according to the judgment result, wherein the judgment for the query can be realized by the Named Entity Recognition technology or other technologies capable of detecting people names from texts. If it is judged that the query contains people names, the query is received in step S203 and the process normally proceeds. If it is judged that the query does not contain a people name, in step S205, the process is terminated, or optionally the query can be still treated as containing people names, and then the process is performed as if the query contains people names, but certainly, the final result of search may be influenced to a certain extent.

Figure 3:
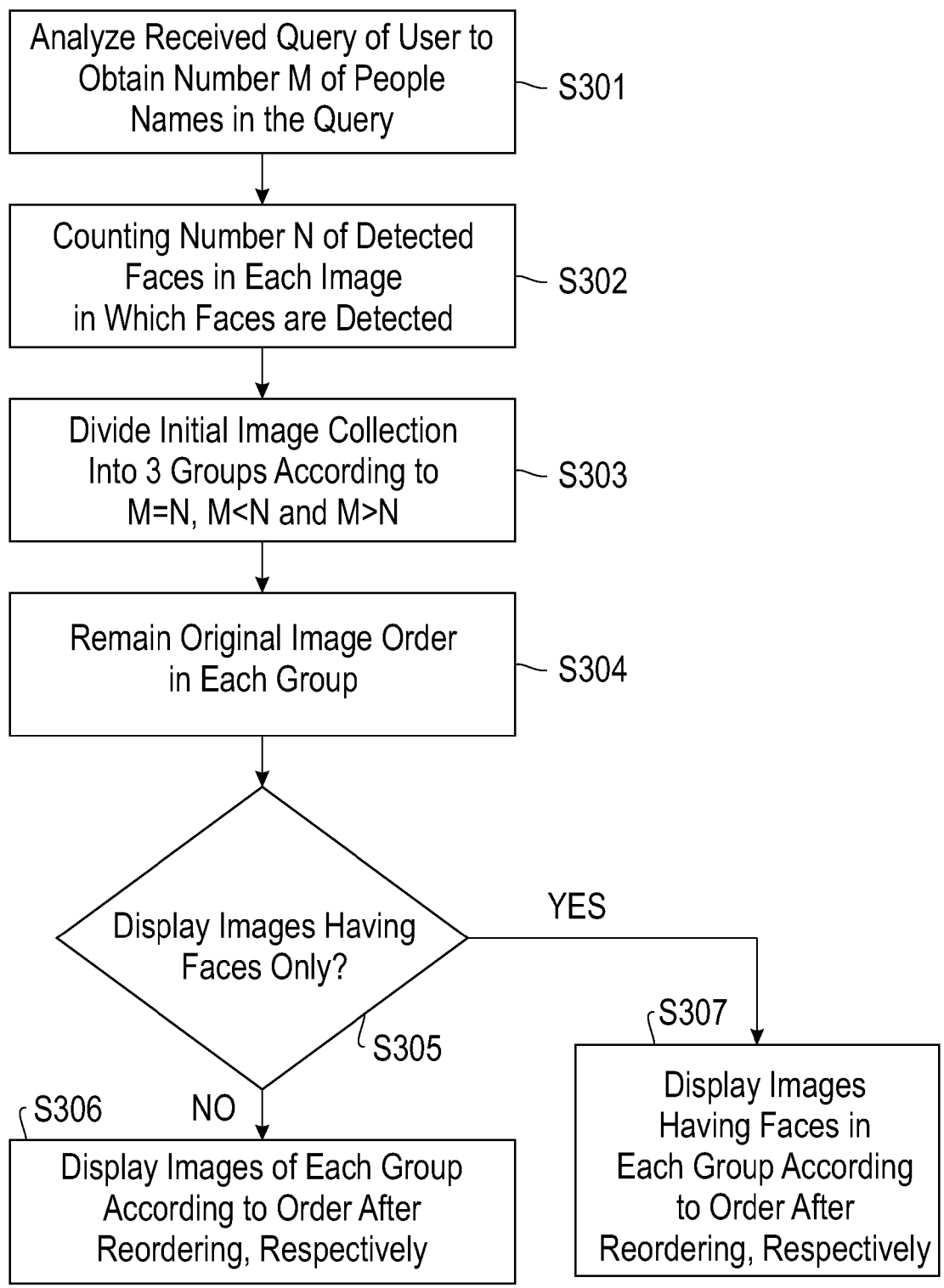
FIG. 3 is a flowchart showing another method of returning images to the user.

FIG. 3 shows another solution for returning images to the user.

At first, in step S301, the query input by the user which is received in the receiving step is analyzed to obtain a number M of the people names in the query. The query is analyzed either by the Named Entity Recognition technology or other technologies capable of detecting the people names from the texts. After detecting or determining the query word in the query as people names, counting is performed to obtain the number M of the people names in the query. Certainly, the judgment may be not performed, and the number of the query words in the query can be directly used as the number M of the people names in the query.

Then, in step S302, with respect to the images in the initial image collection in which faces are detected, the number of the faces in the images is counted to obtain the number N of faces in the image. If there is no image in the initial image collection in which a face is detected, then N=0. The process for counting the number of the faces in the image in the initial image collection can be performed with respect to the images in which faces are detected after detecting all the images in the initial image collection, or be performed while detecting each image in the initial image collection. In the process of detecting faces in the image, either face detection technology or more complex face recognition technology can be used. After the faces are detected or recognized, the counting is performed to obtain the number N of the faces in the image. The number of the faces in the image can be processed statistically, or by the methods disclosed in U.S. Pat. Nos. 7,203,338 B2 or 6,661,907 B2, the teachings of each is hereby incorporated by reference in their entirety.

Then, in step S303, the initial image collection may be divided into three groups according to the cases of M=N, M<N and M>N. In step S304, in each group, the order of the images in the initial image collection can be remained, and the image with N=0 is arranged at the end, as shown in FIG. 8 and FIG. 9.

As shown in FIG. 8, the image group with M=N is composed of the image 8-1 which was the image 6-3 in the initial image collection in FIG. 6; the image group with M<N is composed of the image 8-2 which was the image 6-1 and the image 8-3 which was the image 6-6; the image group with M>N is composed of the images 8-4 to 8-6 which are the images with N=0 and arranged at the end, and decided whether to be displayed according to the user's demand or presetting.

As shown in FIG. 9, the image group with M=N is composed of the image 9-1 which was the image 7-3 in the initial image collection in FIG. 7; the image group with M<N is composed of the image 9-2 which was the image 7-1 in the initial image collection in FIG. 7; the image group with M>N is composed of the images 9-3 to 9-6 wherein the images 9-3 and 9-4 with faces therein, which were the images 7-4 and 7-6 in the initial image collection in FIG. 7, respectively, are arranged ahead, while the images with N=0 are arranged at the end and are decided whether to be displayed according to the user's demand or presetting.

Then, in step S305, it may be decided whether to display the images without face in the initial image collection, that is the images with N=0, according to the user's demand or in advance. If it is decided to display them, the images of three groups with M=N, M<N and M>N are displayed, respectively, and the images with N=0 are display at the end of the group with M>N. If it is decided not to display them, the images of three groups with M=N, M<N and M>N will be displayed, respectively, and the images without face are not displayed at the end of the group with M>N.

In the above embodiment, the process for returning the search result to the user is realized by the way of displaying, but obviously it can be realized by the ways of storing, sending, and so on.

Figure 4:
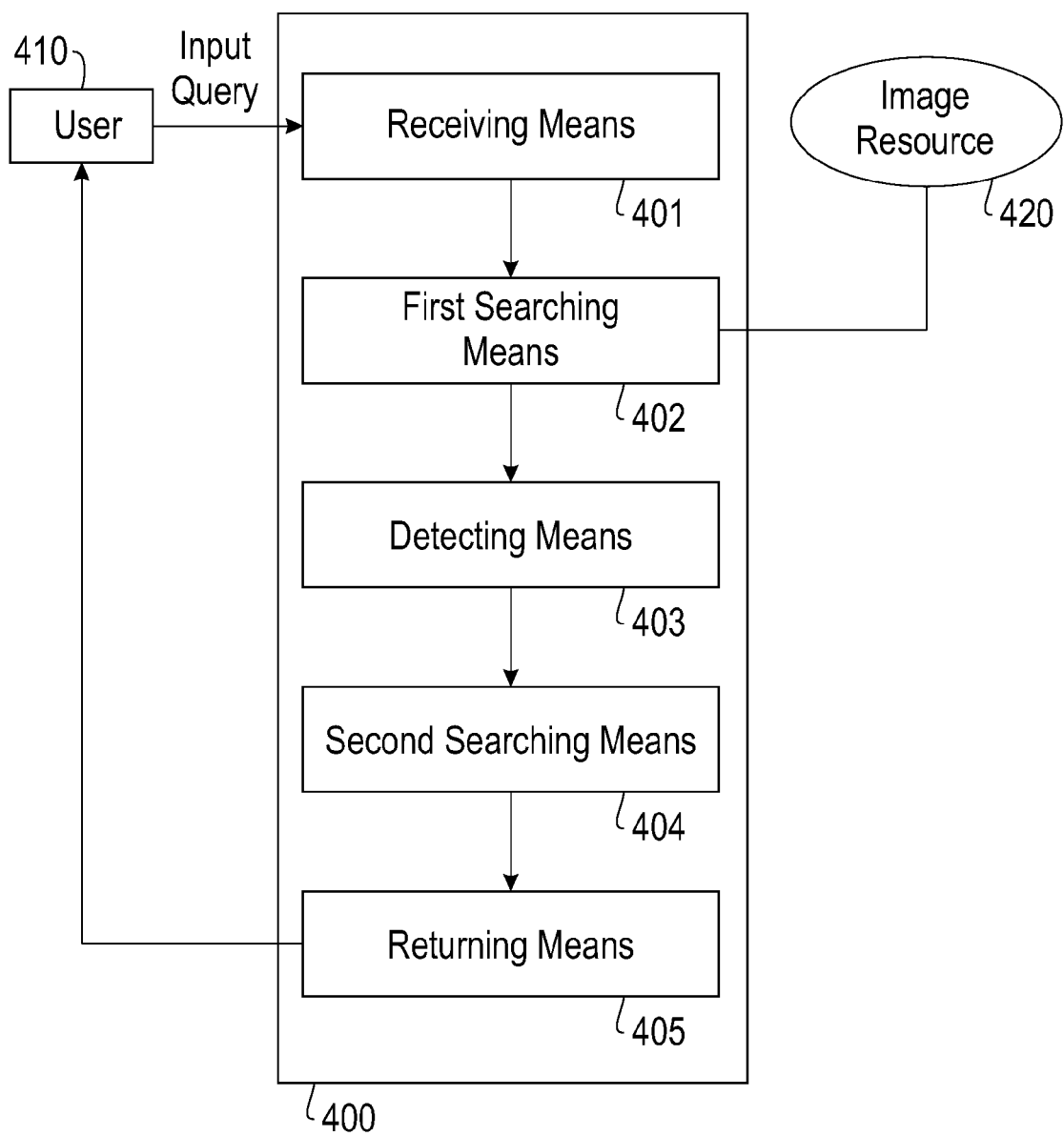
FIG. 4 is a general configuration diagram showing an image search system using face detection according to the invention.

FIG. 4 shows a general configuration of an image search system using face detection according to the invention.

The face search system 400 of the invention includes: a receiving means 401 for receiving a query submitted by a user 410; a first searching means 402 for searching for a query word in the received query from an image resource using an image search engine to obtain an initial image collection; a detecting means 403 for detecting a face in each image in the searched initial image collection; a second searching means 404 for searching for the received query word in a text surrounding each image having the face in said initial image collection, and judging whether said query word indicates a people name in the surrounding text; and a returning means 405 for returning an image in the initial image collection to the user 410 in which a face is included and the query word in said surrounding text indicates a people name.

The face search system of the invention is designed for face search, so it is assumed that since the user 410 performs a face search, after the user 410 inputs a query, the user 410 is considered to ensure the query word in the input query necessarily contains a people name, and the query is received. However, the receiving means 401 of the image search system 400 may also judge for the query input by the user 410, and process according to the judgment result, wherein the judgment for the query can be realized by the Named Entity Recognition technology or other technologies capable of detecting the people name from the texts. If it is judged that the query contains a people name, the receiving means 401 receives the query and continues normal process, and if it is judged that the query does not contain a people name, the process is terminated, or the query can be still treated as containing the people name, and then the process is performed as if the query contains people names, but certainly, the final result of the search may be influenced.

The first search means 402 uses the image search engine to search in the image resource 420 to obtain the initial image collection, wherein said image resource 420 may be intranet, local area network, wide area network or Internet, or database, or even storage devices in personal computers or servers such as hard disc, floppy disc, optical disc and so on.

For example, if the user intends to search for the images of three people of P4, P5, P6 in a certain research group, and inputs a query which is composed of three query word of "P4", "P5" and "P6" in the first search means 405, the obtained initial image collection is as shown in FIG. 10, in which it includes: the group photos of the three people only, such as images 10-1 and 10-14; the group photos of not only the three people P4, P5, P6 but also others, such as images 10-2, 10-10 and 10-15; the photos of a part of the three people, such as images 10-3, 10-6, 10-8, 10-11 and 10-13; and images of none of the three people but related to the three people, such as images 10-4, 10-5, 10-7 and 10-9, and so on, wherein, the images have no person therein but since the image contents are related to the three people, such as "mountain L climbed by P4, P6, P5" in the image 10-4, "river H flowing through houses of P4, P6, P5" in the image 10-5 and so on, and the surrounding texts contain the query word, they are searched out as faces from the image resource 420 by the first search means 402 using the image search engine. In addition, the image 10-12 is also contained wherein the face of "P2" which is not included in the query word is included, but the texts surrounding the image have the word "P6" matching the query word "P6", and the word "P6" in the texts surrounding the image does not indicate a person name "P6".

Detecting means 403 detects whether the image contains a face with respect to each image in the initial image collection. For this, judging whether the image contains a face can be realized by a face detection technology or a more complex face recognition technology.

In addition, the detecting means 403 may detect that images 10-1 to 10-3, 10-6, 10-8, 10-10 to 10-15 in the initial image collection shown in FIG. 10 contain faces.

The second search means 404 searches for the received query word input by the user 410 in the texts surrounding the image with respect to the images in the initial image collection in which faces are detected, and judges whether the searched query word in the surrounding texts indicates people names. The process for judging whether the searched query word in the surrounding texts indicates people names can be realized by the Named Entity Recognition technology or other technologies capable of detecting or determining the people names in the texts. By the above judgment, the query word indicating other meanings such as place names or brand names can be distinguished from the same query word which actually indicates people names.

At this time, the second search means 404 may judge that the "P6" in the image 10-12 shown in FIG. 10 does not indicate the person "P6" but the brand "P6".

The returning means 405 returns the images in the initial image collection in which the faces is included and the query words in said surrounding texts indicate people names.

Then the returning means 405 may return the images 10-1 to 10-3, 10-6, 10-8, 10-10, 10-11 and 10-13 to 10-15.

Figure 5:
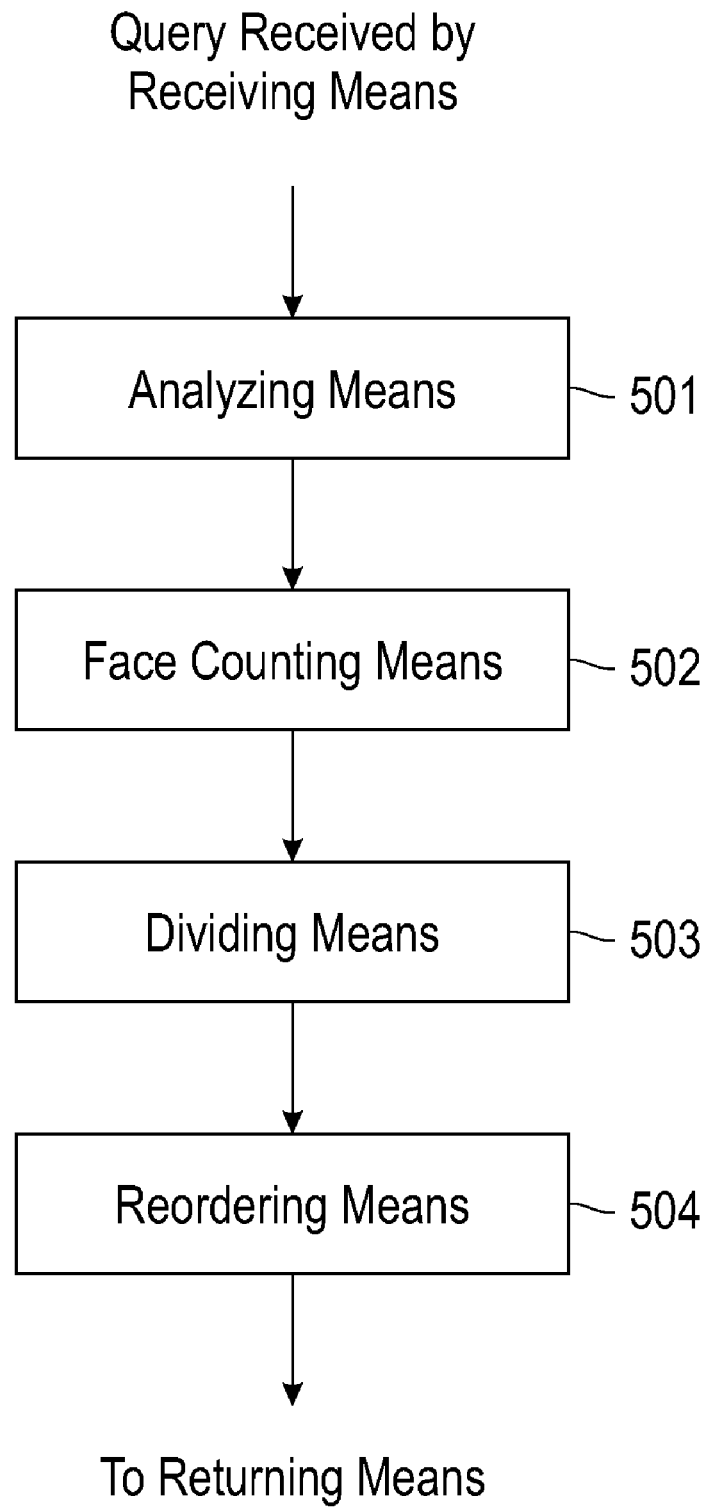
FIG. 5 is a configuration diagram showing another usable configuration for returning images to the user.

FIG. 5 shows another available configuration for returning the images to the user. The configuration may include an analyzing means 501 which analyzes a query received by the receiving means to obtain the number M of people names in the query, a face counting means 502 which counts the number N of the detected faces in each image in which faces are detected by the detecting means, a dividing means 503 which divides the initial image collection into three groups according to M=N, M<N and M>N, a reordering means 504 which remains the order of the images in the initial image collection in each group wherein the images with N=0 are arranged at the end and sends the reordered result to the returning means 405.

The analyzing means 501 may analyze the received query input by the user 410 to obtain the number M of the people names in the query. The analyzing of the query can be realized by the Named Entity Recognition technology or other technologies capable of detecting people names from the texts. After detecting or determining the query words in the query as people names, counting is performed to obtain the number M of the people names in the query. Certainly, the judgment may be not performed, and the number of the query words in the query may be used directly as the number M of the people names in the query. In the example shown in FIG. 10, M=3.

Face counting means 502 counts the number of faces in the images with respect to the images in the initial image collection in which the faces are detected, to obtain the number N of the faces in the images. If there is no image in which a face is detected in the initial image collection, N=0. The process of counting the faces in the images in the initial image collection can be performed with respect to the images in which the faces are detected after detecting all the images in the initial image collection, or be performed while detecting each image in the initial image collection. The process of detecting faces in the images can be realized by face detection technology or more complex face recognition technologies. Once the faces are detected or recognized, the counting is performed to obtain the number N of the faces in the image.

For example, in the example shown in FIG. 10, the images with N=3 include image 3 and image 14, the images with N>3 include images 10-2, 10-10 and 10-15, and the images with N<3 include images 10-4, 10-5, 10-7 and 10-9 in which N=0, as well as image 10-12 in which the query words in the texts surrounding the images do not indicate people names.

The dividing means 503 divides the initial image collection into three groups according to M=N, M<N and M>N. The reordering means 504 remains images in each group in the order of the images in the initial image collection, with the images with N=0 arranged at the end, excludes the images in which the query words in the texts surrounding the images do not indicate people names, and sends the reordered result to the returning means 405. Certainly, the reordering means 504 can also arrange the images in which the query words in the texts surrounding the images do not indicate people names (such as the images 10-12 in FIG. 10) after or before the images with N=0. Further, the images with N=0 and the images in which the query words in the texts surrounding the images do not indicate people names can be excluded by the reordering means 504 individually or together, and not sent to the returning means 405. Also, the reordering means 504 does not have to remain the order of each image in each group in the initial image collection, but can also arrange the images in each group according to other standards (e.g. according to the number of faces in the images, and the like).

The returning means 504 can decide or pre-decide whether to display the images without faces in the initial image collection, i.e. the images with N=0, according to the user's demand. If it is decided to display, the three groups of images with M=N, M<N and M>N are displayed, respectively, and the images with N=0 are displayed at the end of the group with M>N. Otherwise, the three groups of images with M=N, M<N and M>N are displayed, respectively, and the images without faces will not be displayed at the end of the group with M>N.

Figure 11:
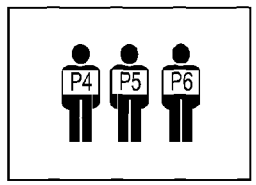
FIG. 11 is a diagram explaining an example of reordered images returned when querying three persons.
Figure 11:
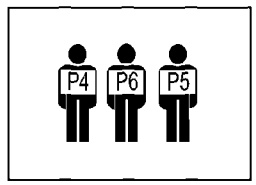
Figure 11:
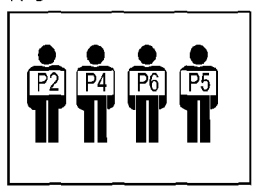
Figure 11:
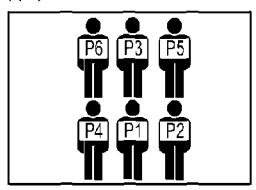
Figure 11:
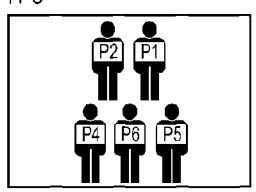
Figure 11:
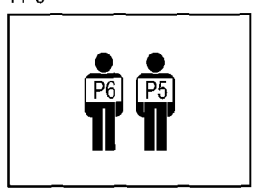
Figure 11:
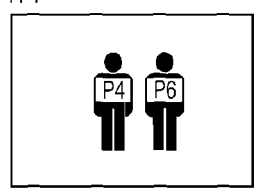
Figure 11:
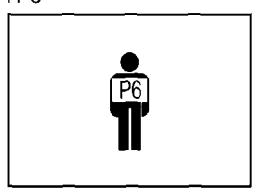
Figure 11:
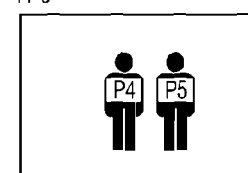
Figure 11:
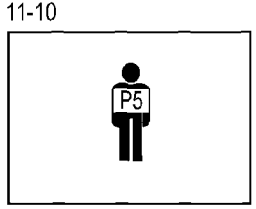
Figure 12:
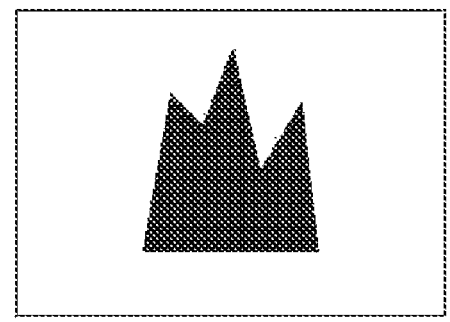
FIG. 12 is a diagram continuing FIG. 11 explaining an example of reordered images returned when querying three persons.
Figure 12:
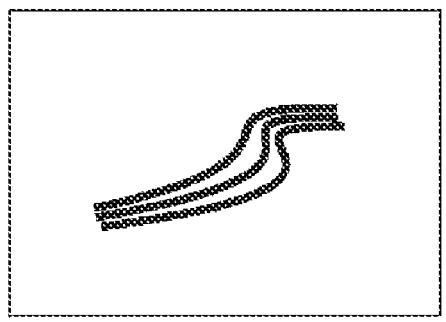
Figure 12:
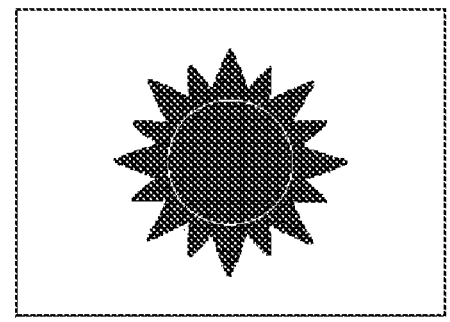
Figure 12:
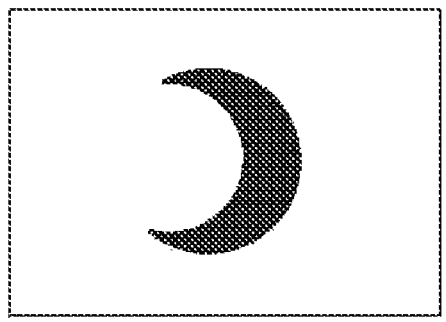

The result of returned images may be as shown in FIG. 11 and FIG. 12 following FIG. 11. As shown in FIG. 11, the images 10-3 and 10-14 with M=N in the FIG. 10 are returned firstly as the reordered images 11-1 and 11-2; the images 10-2, 10-10 and 10-15 with M<N in FIG. 10 are then returned as the reordered images 11-3 to 11-5; the images 10-3, 10-6, 10-8, 10-11 and 10-13 with M>N in FIG. 10 are then returned as the reordered image 11-16 to 11-10; at last, as shown in FIG. 12, the images 10-4, 10-5, 10-7 and 10-9 are optionally returned as the reordered images 12-1 to 12-4.

However, obviously the returned images can be in the orders other than M=N, M<N and M>N. These three groups of images may be returned independently, or in other orders.

The process of returning the search result to the user can be realized by displaying, and obviously can also be realized by storing, sending, and so on.

Figure 13:
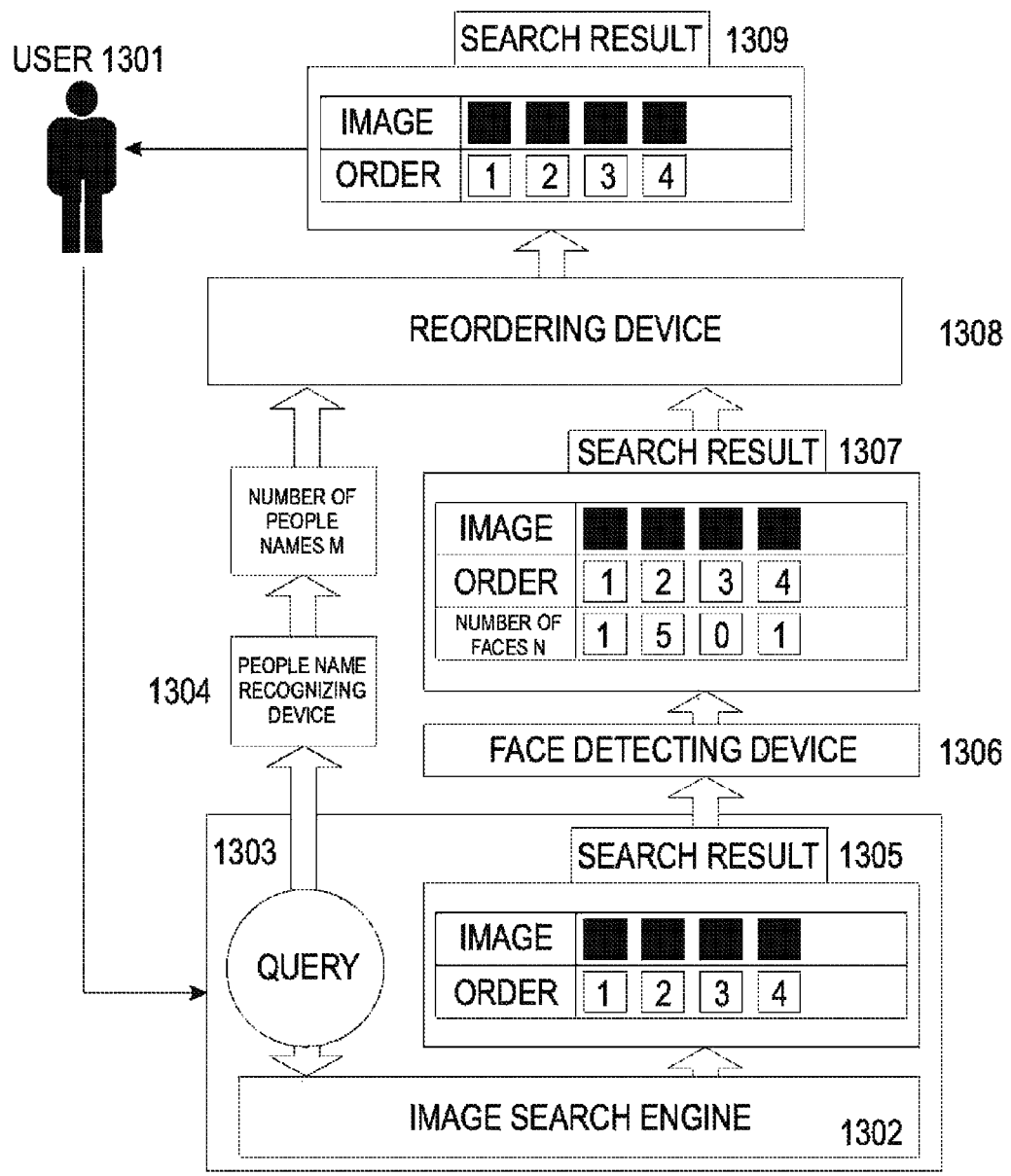
FIG. 13 is a schematic diagram of a specific operation manner implementing the invention.

FIG. 13 shows a specific operation manner of implementing the invention.

A user 1301 inputs a query 1303 in an image search engine 1302. The image search engine 1302 searches images from an image resource, arranges the images, and sends the searched images together with the order to a face detector 1306 as a search result 1305. The face detector 1306 may be realized by combining the detecting means 403 and the face counting means 502. The face detector 1306 detects the faces in the images provided by the image search engine 1302 and counts the number of the faces to obtain the number N of the faces in each image. Then, the face detector 1306 sends the images provided by the image search engine, the order of respective images and the number N of the faces in the respective images to a reordering device 1308 as a search result 1307. The reordering device 1308 can be realized by combination of the dividing means 503, the reordering means 504 and the returning means 405.

Also, the query 1303 input by the user 1301 to the image search engine 1302 is sent to a people name recognizing device 1304 which may be realized by the analyzing means 501. The people name recognizing device 1304 recognizes the people names in the query 1303 and counts the number of the people names to obtain the number M of people names in the query. Then, the people name recognizing device 1304 sends the number M of the people names to the reordering device 1308.

The reordering device 1308 compares the number M of the people names and the number N of the faces in each image, divides the images into groups according to M=N, M<N and M>N, reorders the images in the order of M=N, M<N and M>N, remains the initial order in each group wherein the images with N=0 are arranged at the end. Then, the reordered images together with the new order are returned to the user 1301 as a search result 1309.

As to reordering performed on the searched images, the method disclosed in U.S. Pat. No. 7,127,452 B1 can be used in addition to the method provided in the above embodiment.

It is particularly noted that in consideration of copyright, people right and politics, religion and so on, in the present specification, the image search method and the image search system using face detection of the invention are explained by means of schematic images, those skilled in the art should be able to understand the principle of the invention from the above explanative but not limitative embodiments and use the image search method and system describe by the specification for face searches.

The above statement is proposed for explanation and description, but not for itemizing or limiting the invention into the disclosed specific form. According to the above explanation, various modifications and changes can be made. It is intended that the scope of the invention is not limited by the detailed description herein, but limited by the appended claims. The above explanative and illustrated embodiments provide the entire explanation for the production and component use of the invention. Various embodiments of the invention can be made without departing from the spirit and scope of the invention and the invention exists in the appended claims.

What is claimed is:

1. A method for searching images using face detection, the method comprising:
   executing with a processor of an information processing system the following:
   receiving a query submitted by a user, wherein the query comprises at least one query word;
   searching, in response to receiving the query, a set of image resources;
   obtaining, in response to the searching, an initial set of images from the set of image resources that is associated with the query word;
   identifying a set of images in the initial set of images that comprises at least one face, the set of images comprising a first order;
   analyzing a set of text comprising the query word and associated with each image in the set of images that has been identified;
   determining, in response to the analyzing, if the query word within the set of text indicates a person's name;
   in response to the query word indicating a person's name, analyzing the query to obtain a number, M, of people's names in the query;
   counting a number, N, of faces in each image in the set of images that have been identified;
   dividing the initial set of images into a set of three groups of images comprising a first group of M=N, a second group of M<N, and a third group of M>N;
   re-ordering the initial set of images in a second order based on the set of three groups with the group M=N being a first ordered group in the second order; and
   returning one or more images in the initial set of images that have been re-ordered in the second order in response to the query word in the set of text associated with the one or more images indicating a person's name.

2. The method according to claim 1, wherein determining if the query word within the set of text indicates a person's name further comprises:
   using a Named Entity Recognition technology to determine if the query word within the set of text indicates a person's name.

3. The method according to claim 1, further comprising:
   using a Named Entity Recognition technology to determine if the query comprises at least one person's name.

4. The method according to claim 1, wherein the set of image resources is at least one of:
   an intranet,
   a local area network,
   a wide area network, and
   an Internet.

5. The method according to claim 1, wherein returning one or more images further comprises:

displaying each image in the initial set of images that have been re-ordered in the second order according to an order of the first group, the second group, and the third group within the second order.

6. The method according to claim 5, wherein returning the one or more images further comprises displaying one or more images failing to comprise a face.

7. An image search system using face detection, comprising:
   a memory;
   a processor; and
   a face searching system communicatively coupled to the memory and the processor, the face searching system configured to perform a method comprising:
   receiving a query submitted by a user, wherein the query comprises at least one query word;
   searching, in response to receiving the query, a set of image resources;
   obtaining, in response to the searching, an initial set of images from the set of image resources that is associated with the query word;
   identifying a set of images in the initial set of images that comprises at least one face, the set of images comprising a first order;
   analyzing a set of text comprising the query word and associated with each image in the set of images that has been identified;
   determining, in response to the analyzing, if the query word within the set of text indicates a person's name;
   in response to the query word indicating a person's name, analyzing the query to obtain a number, M, of people's names in the query;
   counting a number, N, of faces in each image in the set of images that have been identified;
   dividing the initial set of images into a set of three groups of images comprising a first group of M=N, a second group of M<N, and a third group of M>N;
   re-ordering the initial set of images in a second order based on the set of three groups with the group M=N being a first ordered group in the second order; and
   returning one or more images in the initial set of images that have been re-ordered in the second order in response to the query word in the set of text associated with the one or more images indicating a person's name.

8. The system according to claim 7, wherein the searching further comprises:
   using a Named Entity Recognition technology to determine if the query word within the set of text indicates a person's name.

9. The system according to claim 7, further comprising:
   using a Named Entity Recognition technology to determine if the query comprises at least one person's name.

10. The system according to claim 7, wherein the set of image resources is at least one of:
    an intranet,
    a local area network,
    a wide area network, and
    an Internet.

11. The system according to claim 7, wherein returning one or more images further comprises:
    displaying each image in the initial set of images that have been re-ordered in the second order according to an order of the first group, the second group, and the third group within the second order.

12. The system according to claim 11, wherein returning the one or more images further comprises:
    displaying one or more images failing to comprise a face.

* * * * *